(No Model.)

G. A. SCHEEFFER.
ELECTRIC METER.

No. 530,351. Patented Dec. 4, 1894.

Witnesses:
George L. Cragg
George S. Buell

Inventor:
Gustave A. Scheeffer
By Barton & Brown
Attorneys.

UNITED STATES PATENT OFFICE.

GUSTAVE A. SCHEEFFER, OF PEORIA, ILLINOIS, ASSIGNOR TO THE DIAMOND ELECTRIC COMPANY, OF SAME PLACE.

ELECTRIC METER.

SPECIFICATION forming part of Letters Patent No. 530,351, dated December 4, 1894.

Application filed July 17, 1894. Serial No. 517,795. (No model.)

*To all whom it may concern:*

Be it known that I, GUSTAVE A. SCHEEFFER, a citizen of the United States, residing at Peoria, in the county of Peoria and State of Illinois, have invented a certain new and useful Improvement in Electric Meters, (Case No. 1,) of which the following is a full, clear, concise, and exact description, reference being had to the accompanying drawings, forming a part of this specification.

My invention relates to an electric meter for alternating electric currents, and its object is the provision of a meter that shall act to accurately measure the quantity of energy consumed in a working circuit.

In Letters Patent No. 522,674, dated July 10, 1894, I have described a meter in which the rotatable element comprises a cylindrical metallic body mounted to rotate about an axis under the influence of two magnetic fields, one of the fields lagging in phase behind the other, the one field being excited by a coil connected in series with the working circuit, while the other is excited by a coil of high resistance and impedance connected in multiple with the working circuit, that is, across the feeding mains. The shifting magnetic field produced by the co-action of the two coils produces rotation of the rotatable member, any change of current strength acting through the series coil to produce a change of rotation, while any change of potential on the circuit acts through the shunt coil to correspondingly change the rotation.

My present invention has for its object the provision of means for entirely removing the deleterious effects of friction encountered by the movable element, whereby the meter may be as sensitive to small currents as to large currents.

I will describe my invention by reference to the accompanying drawings, in which—

Figure 1:
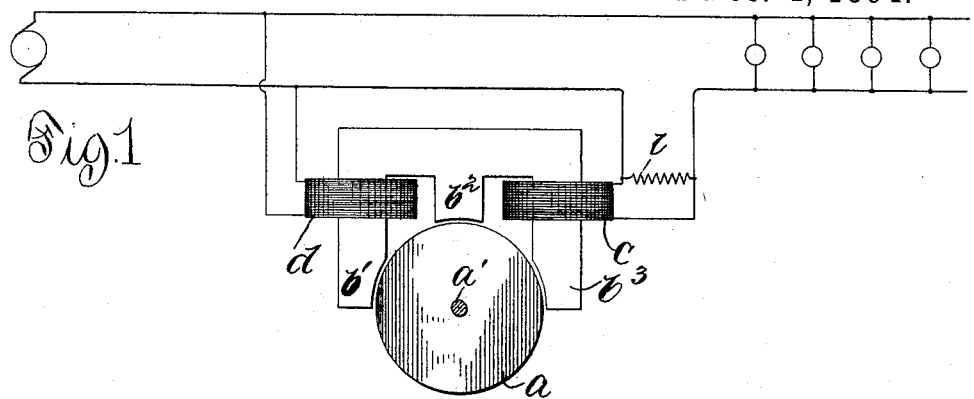
Figure 2:
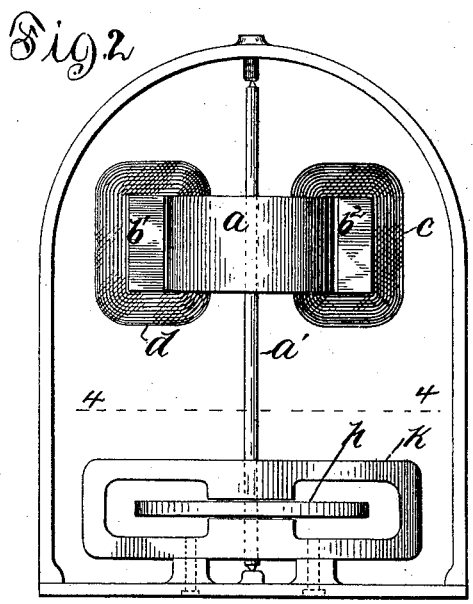
Figure 3:
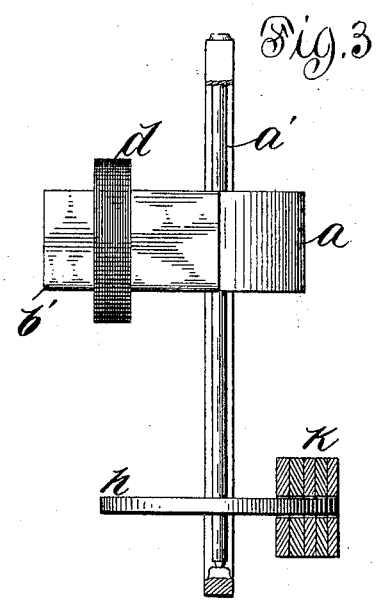
Figure 4:
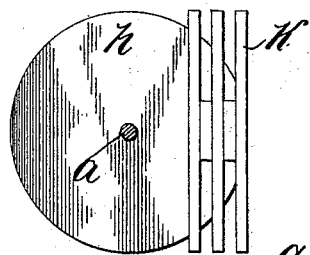

Figure 1 is a diagrammatical illustration of my invention. Fig. 2 is an elevation of a meter embodying my invention. Fig. 3 is a side view of Fig. 2. Fig. 4 is a sectional view on line 4—4, Fig. 2.

Like letters refer to like parts in the several figures.

The rotatable element $a$, which is preferably made in the form of a hollow drum, rotates in front of poles $b'$ $b^2$ $b^3$. The coil $c$ is connected in series with the working circuit, while the coil $d$ is connected in multiple therewith, that is, across the mains, the resistance and impedance of coil $d$ being considerable so that the magnetic field due to coil $d$ lags in phase behind the field produced by coil $c$, a shifting magnetic field being thus produced which imparts rotation to the rotatable element $a$ by inducing Foucault currents thereon. The coil $c$ being in series with the translating devices in the working circuit, any increase or decrease of current flowing therein will correspondingly change the strength of the field induced by coil $a$ and a consequent change in rotation of the element $c$ results. The coil $d$ being connected across the mains is not affected by changes in the strength of the current traversing the working circuit, but responds to changes of potential, thereby varying the speed of rotation of the element $a$ in accordance with changes of potential.

The element $a$ is mounted upon a shaft $a'$ delicately journaled to rotate in end bearings. Upon the shaft $a'$ is mounted a disk $h$ which in its rotation moves through the magnetic field of a permanent magnet $k$, which is located upon the opposite side of the shaft $a'$ to that upon which the coils $c$ and $d$ are mounted.

One great difficulty heretofore experienced with meters results from the fact that the effects of friction have not been entirely eradicated. When the current flowing is considerable, the counteracting effect of friction is negligible, but when the current flowing is small, the friction becomes of such importance that if some provision be not made, to compensate for the effects of friction, the meter wholly fails to perform its functions. In order to thus overcome the deleterious effects of friction, I construct the rotatable element $a$ and the retarding disk $h$ of aluminum. I am thus enabled to get the same rotating effect of the element $a$, and the same retarding effect of the disk $h$, as though they were made of copper, but with a saving of one third in weight, thus reducing the friction one third.

Aluminum has but half the conductivity of copper, speaking in round numbers, and consequently when aluminum is used twice as much metal in volume must be employed, but aluminum possesses but one third the weight of copper, so that even though double the volume be employed, but two-thirds the weight is employed.

To further reduce the effects of friction I provide a short circuit $l$ about the series coil $c$. The coil $c$ thus acts as the secondary of a transformer, of which the coil $d$ is the primary and the result is a current induced in the coil $c$. The resistance of the path $l$ is so adjusted that the current induced is just sufficient to produce a magnetic field that shall act upon the element $a$ to impart to the same a tendency to rotate just sufficient to overcome the friction of the bearings. The operation will be readily understood if it be supposed that all the lamps in the working circuit be turned off so that no current flows through the working circuit. There is, however, current flowing through coil $d$ and this current induces a current in coil $c$, which coacts with coil $d$ to subject the element $a$ to a torque just equal in amount to the opposing force of friction. The element $a$ thus stands just on the point of starting so that if a very small current now traverse the working circuit the element $a$ will rotate.

By the construction herein set forth I am enabled to overcome entirely the objectionable effects of friction and produce a device which operates to measure as accurately when a single lamp is burning as when a large number is burning.

Instead of making the magnetic core in the form shown—that is, with three legs, the cores of the two coils may be made separate, and may occupy other positions around the periphery, but the best results are attained when the construction is that illustrated.

Having thus described my invention, what I claim as new, and desire to secure by Letters Patent, is—

1. In a meter the combination with an element mounted to rotate under the influence of two magnetic fields, of a coil in series with the working circuit for exciting one of said fields, a coil in parallel with the working circuit, and carrying a lagging current for exciting the second field, and a short circuit about the series coil to neutralize the effects of friction, substantially as described.

2. In a meter, the combination with a rotatable element adapted to be rotated under the influence of the current to be measured, of a coil connected in parallel with the working circuit, a second coil in inductive relation thereto, said coils being adapted to coact to neutralize the effects of friction, substantially as described.

3. In a meter, the combination with magnetic poles, of a drum of aluminum mounted upon a vertical shaft and adapted to rotate in front of said poles, a shunt coil and a series coil for producing two fields of displaced phase to effect the rotation of said drum, a retarding disk of aluminum mounted upon said shaft, a permanent magnet, past the poles of which said disk is adapted to be rotated, and a short circuit about said series coil, adjusted to neutralize the effects of friction, substantially as described.

In witness whereof I hereunto subscribe my name this 10th day of July, A. D. 1894.

GUSTAVE A. SCHEEFFER.

Witnesses:
 EMMA LUCAS,
 W. E. FRANCIS.